United States Patent [19]
Kusaka

[11] Patent Number: 5,565,956
[45] Date of Patent: Oct. 15, 1996

[54] FOCUS DETECTING CAMERA

[75] Inventor: Yosuke Kusaka, Yokohama, Japan

[73] Assignee: Nikon Corporation, Tokyo, Japan

[21] Appl. No.: 352,896

[22] Filed: Dec. 9, 1994

[30] Foreign Application Priority Data

Dec. 10, 1993 [JP] Japan .................................. 5-310483
Dec. 10, 1993 [JP] Japan .................................. 5-310484

[51] Int. Cl.⁶ .................................................. G03B 13/36
[52] U.S. Cl. .................................................. 396/114
[58] Field of Search .................................. 354/402, 406, 354/407, 408; 250/201.2, 201.7, 201.8

[56] References Cited

U.S. PATENT DOCUMENTS 4,497,561   2/1985   Suzuki ..................... 354/406
4,563,576   1/1986   Matsumura et al. ............... 354/406 X Primary Examiner—W. B. Perkey

[57] ABSTRACT

A focus detecting device for use in a camera or the like increases the probability of capturing a desired object in a view finder by a light-receiving unit having a small width in a projected image when a focus frame in a view finder is placed on the object. The device includes a phototaking optical system for forming a primary image of the object on the phototaking image frame, a focus detecting optical system for re-imaging the primary image as second images, an image sensor including first and second light-receiving units for receiving the secondary images and a focus detecting calculation unit for detecting the focus state of the phototaking optical system from the output of the image sensor.

6 Claims, 17 Drawing Sheets

FOCUS DETECTING CAMERA

BACKGROUND OF THE INVENTION

1. Field of the Invention

The present invention relates to a focus detecting device adapted for use in a camera or the like.

2. Related Background Art

There is already known, for use in a camera or the like, a focus detecting device of so-called divided-pupil re-imaging system, which is based on the following principle. At first a primary image, formed by a pair of light beams passing through mutually different two areas on the pupil of a phototaking optical system, is re-imaged by a pair of re-imaging optical elements to form a pair of secondary images, which are then converted into a pair of electrical image signals by an image sensor provided with a pair of light-receiving units. The relative positional relationship of said paired electrical image signals is detected by a correlation calculation, and the focus state of said phototaking optical system relative to an anticipated focal plane (for example a film plane) is detected from thus detected distance of the images.

In such focus detecting device, each of said paired light-receiving units is composed of a one-dimensional array of plural pixels, and, if such paired light-receiving units are projected by the corresponding re-imaging optical elements onto said anticipated focal plane, the obtained projected images substantially coincide mutually, and the focus detecting area is defined by the shape of such projected images. Consequently, the focus detecting area is usually elongated one-dimensionally, corresponding to the projected images of said light-receiving units.

Such a conventional focus detecting device are disclosed in, for example, Japanese Patent Application Laid-open Nos. 55-111928, 59-65814, 62-86318, 1-81924, 1-189619, 4-332015, 4-277712, 4-277713, 5-264887, 6-186473, 6-265774, 6-273665 or 6-308379 or U.S. Pat. Nos. 4,560,863 or 4,563,576 or Japanese Patent Application No. 5-140975 filed on Jun. 11, 1993.

In such conventional focus detecting device, it has been difficult to cover the wide range of luminance, of about 20 EV, of the object, variable from a high luminance state to a low luminance state, even by the adjustment of the amplifying gain of the sensor output and of the charge accumulating time of the pixels, since the light-receiving area of the pixels constituting the light-receiving units is fixed.

In order to avoid such drawback, it is conceivable to form, in the vicinity of said light-receiving units, another pair of light-receiving units of a larger pixel area and to detect the focus state, in a low luminance state, by the outputs of the latter light-receiving units. Since the focus detecting area should preferably remain the same as much as possible for the low luminance state and for the high luminance state, the pixel array constituting the light-receiving units of the smaller pixel area and that constituting the light-receiving units of the larger pixel area are arranged mutually parallel and mutually close, and a same pair of re-imaging elements are employed for projecting different portions of same object images on said two pairs of light-receiving units.

Also for increasing the area of each pixel while maintaining the accuracy of focus detection, it is desirable to increase the dimension of the pixels in a direction perpendicular to the direction of array of the pixels, while not varying the pitch of array of the pixels. As a result, if such light-receiving units of the larger pixel area is inversely projected onto the anticipated focal plane, the width of the projected image (in a direction perpendicular to the direction of one-dimensional array of the pixels) becomes larger than the width of the projected image, obtained when the light-receiving units of the smaller pixel area are inversely projected onto the anticipated focal plane.

The above-explained light-receiving units formed in two pairs can be adopted for avoiding the aforementioned drawback, but, as the projected images of the two-paired light-receiving units on the anticipated focal plane do not mutually overlap, the focus detection may be erroneously conducted for the background in case the object is small and cannot be properly captured by such light-receiving units.

There has not so far been provided a device in which the positional relationship between the phototaking frame or the focus frame, indicating the focus detecting area, and the projected images of two pairs of the light-receiving areas, in consideration of the difference in shape of the projected images of the two pairs of the light-receiving units onto the anticipated focal plane and of the general rule of the object (objects being often distributed in the vertical direction, along the direction of gravity) for preventing the aforementioned drawback.

SUMMARY OF THE INVENTION

The object of the present invention is to provide a camera capable of focus detection by exactly capturing the object, despite a simple configuration.

DESCRIPTION OF THE PREFERRED EMBODIMENTS

In the following description first, second and third embodiments of the present invention are explained with reference to FIGS. 1 to 9, FIGS. 10 and 11 and FIGS. 12A to 13, respectively.

Figure 1:
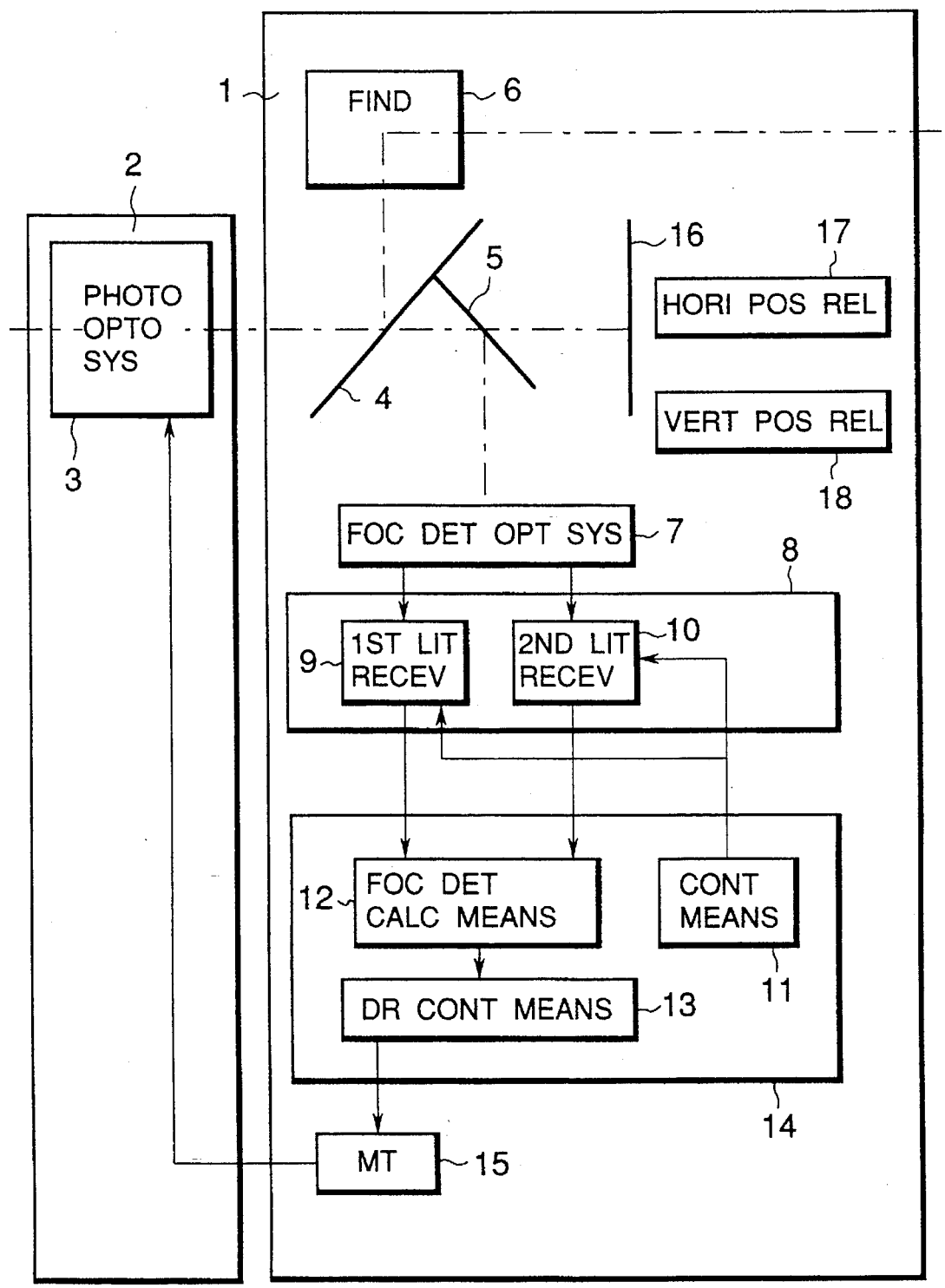
FIG. 1 is a block diagram showing the configuration of a first embodiment of the present invention.

FIG. 1 is a block diagram of a first embodiment of the present invention.

A lens 2 is rendered interchangeable with respect to a camera body 1, and FIG. 1 shows a state in which the lens 2 is mounted on the body 1.

The lens 2 incorporates a phototaking optical system 3, and a light beam coming from an object and passing through the phototaking optical system 3 is divided, by a main mirror 4 consisting of a half mirror, into a direction of a sub mirror 5 and another direction of a view finder 6.

The light beam further deflected by the sub mirror 5 toward the bottom of the camera body is guided to a focus detecting optical system 7 provided in the vicinity of an anticipated focal plane (film plane) 16 of the phototaking optical system 3 and forms images respectively on a first light-receiving unit 9 and a second light-receiving unit 10, each consisting of a pair of light-receiving units formed on a charge-accumulating image sensor (CCD) 8.

The details of said focus detecting optical system 7 and said charge-accumulating image sensor 8 will be explained later.

The view finder 6 for observing an object image formed by the phototaking optical system 3 on the anticipated focal plane 16 is provided with a field frame for defining the phototaking frame and a focus frame for displaying the focus detecting area in superposition with the object image on the phototaking frame.

Under the control by control means 11 in a microcomputer 14, the first and second light-receiving units 9, 10 generate object image signals, corresponding to intensity distribution of the object images formed on said light-receiving units. A pair of electrical object image signals from the first light-receiving unit 9 or a pair of electrical object signals from the second light-receiving unit 10 are fetched into the microcomputer 14, and focus detecting calculation means 12 determines the relative positional relationship of said object image signals by calculation, thereby detecting the defocus amount d between the image plane of the phototaking optical system 3 and the anticipated focal plane 16.

Drive control means 13 contained in the microcomputer 14 controls the direction and amount of rotation of a motor 15 according to said defocus amount d. Said motor 15 is connected with the phototaking optical system 3, which is thus moved in the axial direction so as to bring the defocus amount d to zero, whereby said phototaking optical system 3 is brought to the in-focus state.

A horizontal position release 17 and a vertical position release 18 activates, respectively in a phototaking operation in the horizontal position and that in the vertical position, an unrepresented shutter positioned in front of the anticipated focal plane 16, thereby exposing a film, positioned on said anticipated focal plane, to the image of the object.

Figure 2:
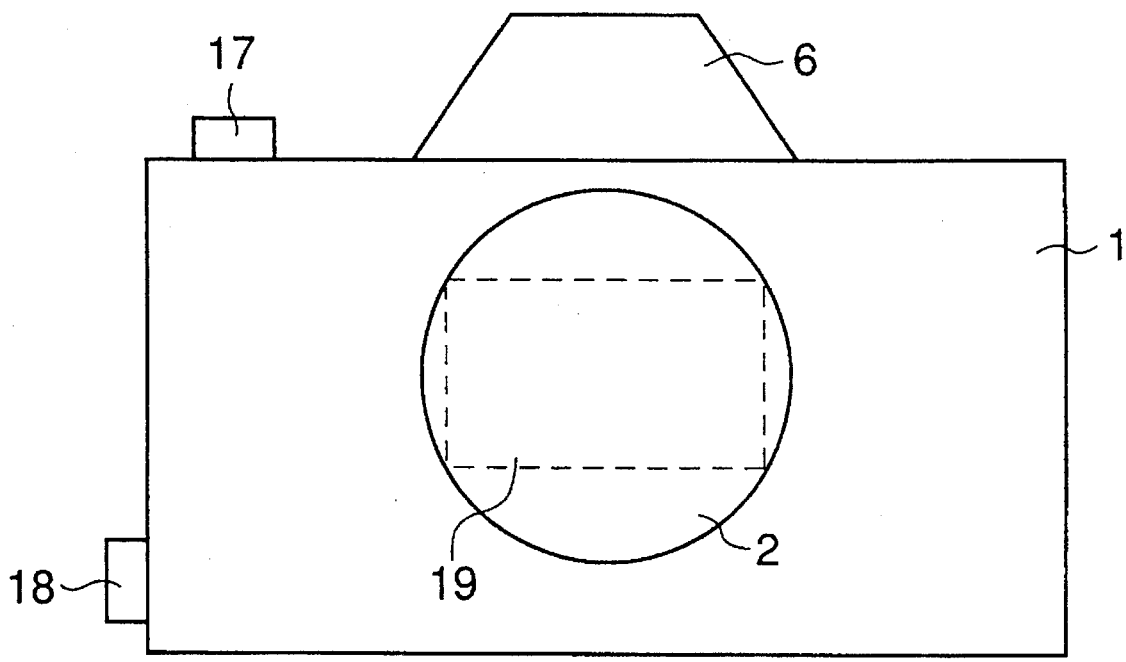
FIG. 2 is an external view of a camera incorporating the first embodiment of the present invention.

FIG. 2 is an external view of a camera incorporating the first embodiment of the present invention, in the horizontal position, seen from the side of the lens 2, wherein broken lines indicate the shape of a shutter aperture 19 at the exposure operation. Said shutter aperture 19 is rectangular, composed of longer horizontal sides and shorter vertical sides and corresponding to the field frame in the view finder 6, which is provided in the upper part of the body 1. The horizontal position release button 17 and the vertical position release button 18 are provided respectively in the upper left part and the lower left part of the body 1, when seen from the side of the lens 2. These positions are selected for smooth release of the shutter with the index finger of the right hand, when the camera is held by a right-handed person.

Figure 3:
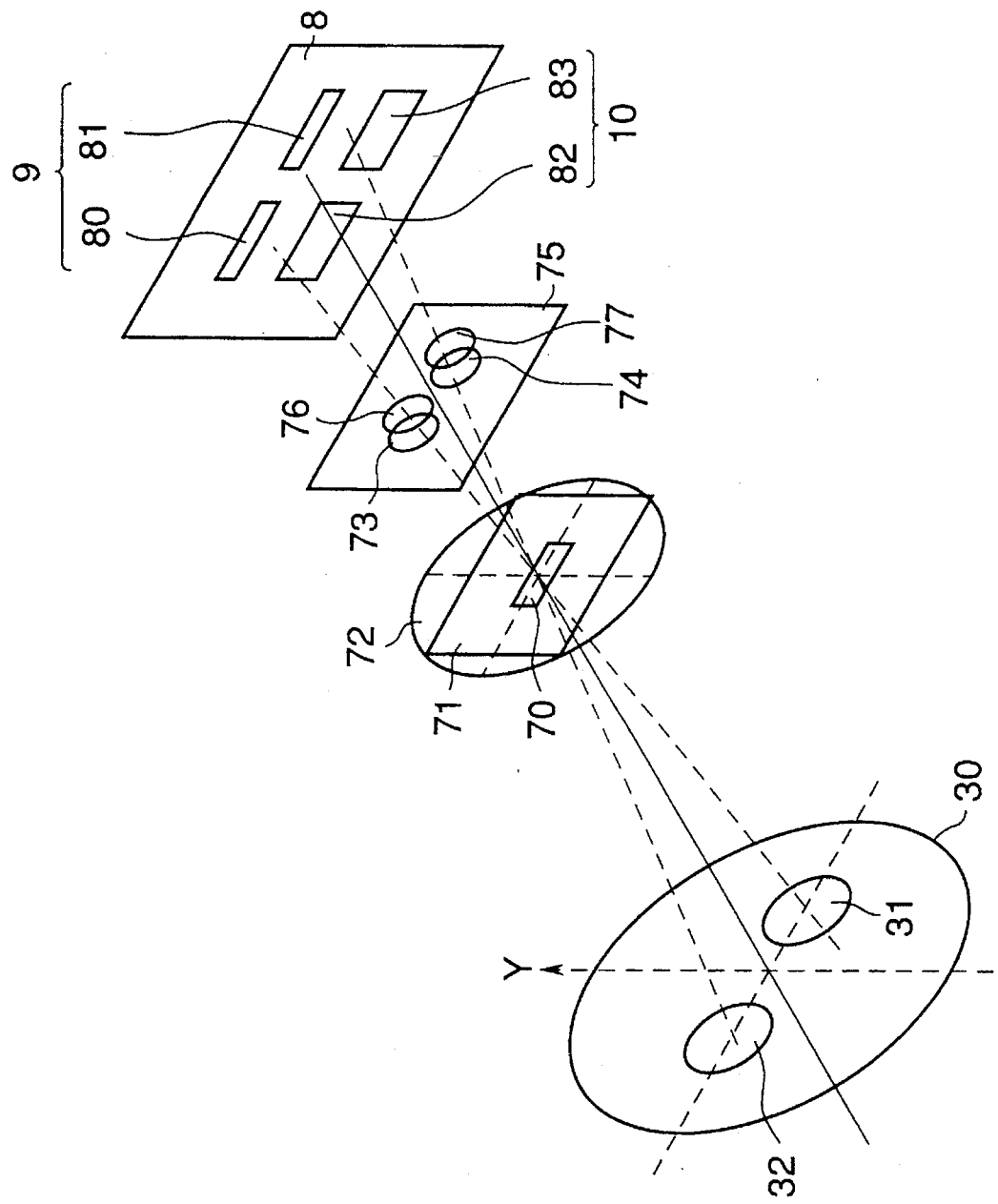
FIG. 3 is a perspective view of a focus detecting optical system of the first embodiment of the present invention.

FIG. 3 shows the configuration of the focus detecting optical system 7 and the charge-accumulating image sensor 8 of the first embodiment.

The focus detecting optical system 7 is composed of a field mask 71 having an aperture 70, a condenser lens 72, a diaphragm mask 75 having a pair of diaphragm apertures 73, 74 and a pair of re-imaging lenses 76, 77. The charge-accumulating image sensor 8 is provided with two pairs of light-receiving units 80, 81; 82, 83. A primary image, formed on the optical axis in the vicinity of the aperture 70 by the phototaking optical system 3, is re-imagined as a pair of secondary images respectively on the light-receiving units 80, 82 and 81, 83. The paired light-receiving units 80, 81 constitute the first light-receiving unit 9 while another pair 82, 83 constitutes the second light-receiving unit 10.

The focus detecting optical system shown in FIG. 3 is incorporated in the camera body shown in FIG. 2 in such a manner that the Y-axis shown in FIG. 3 corresponds to the direction of the view finder 6 shown in FIG. 2. Thus, in the ordinary phototaking operation in the horizontal position of the camera (in which the view finder 6 is positioned on top of the body 1 and the horizontal release button is positioned on the upper right part of the body 1), the direction of the Y-axis in FIG. 3 corresponds to the upper direction of the phototaking image frame.

Figure 4:
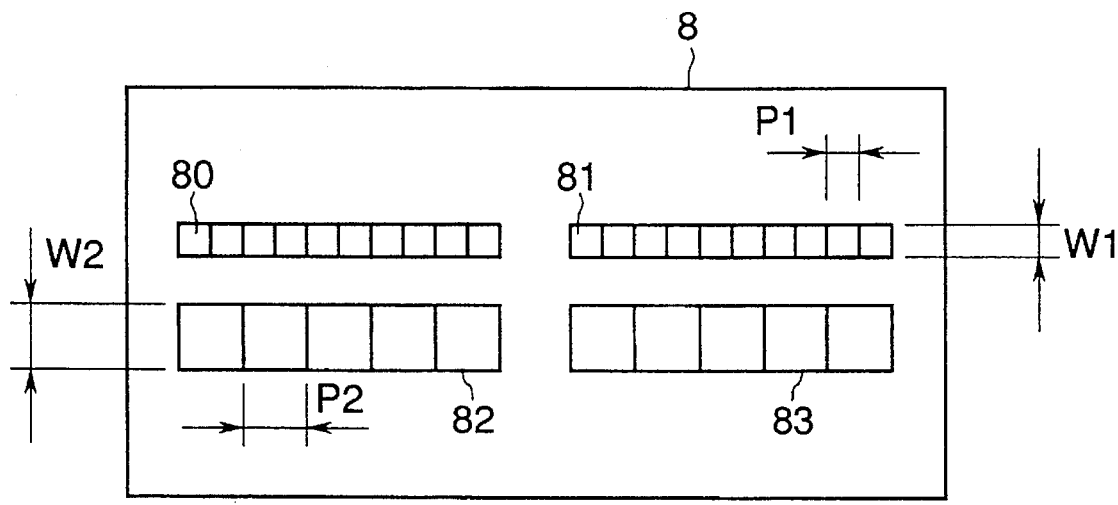
FIG. 4 is a plan view of an image sensor in the first embodiment of the present invention.

As shown in FIG. 4, the light-receiving units 80, 81 consist of one-dimensional arrays of plural pixels, with a pitch P1 and a height W1 thereof. On the other hand, the light-receiving units 82, 83 are also composed of one-dimensional arrays of plural pixels, with a pitch P2 (> P1) and a height W2 (> W1).

The pixel arrays constituting the light-receiving units 80, 81 and those constituting the units 82, 83 are arranged mutually parallel, and the light-receiving units 80, 82 and those 81, 83 are positioned very close mutually.

Since the pixel area P2×W2 of the light-receiving units 82, 83 is larger than the pixel area P1×W1 of the light-receiving units 80, 81, the charge accumulating time required to obtain a given output level is shorter in the units 82, 83. The light-receiving units 80, 81 of the smaller pixel area is suitable for focus detection of a smaller object or of a higher precision, so that the units 80, 81 are used for ordinary focus detection, while the units 82, 83 are used under a special situation such as a low luminance state.

In the configuration shown in FIGS. 3 and 4, the paired diaphragm apertures 73, 74 are projected, by the condenser lens 72, on paired areas 31, 32, symmetrical with respect to the optical axis, on a plane 30 in the vicinity of the exit pupil of the phototaking optical system 3, and the light beams passing said areas form the primary image in the vicinity of the field mask 71. Said primary image, formed on the aperture 70 of the field mask 71, is transmitted by the condenser lens 72 and the paired diaphragm apertures 73, 74 to form, by means of the paired re-imaging lenses 76, 77, paired secondary images respectively on the light-receiving units 80, 82 and the light-receiving units 81, 83 of the charge accumulating image sensor 8.

The intensity distributions of said paired secondary images are converted by the light-receiving units 80, 82 and those 81, 83 into electrical object image signals.

Since the units 80, 81 and 82, 83 are mutually different in pixel area, the charge accumulating time is respectively set by the aforementioned control means 11 so as to obtain an appropriate output level for the focus detecting calculation.

[Positional relationship of two light-receiving units and focus frame]

In the following there will be explained, with reference to FIGS. 5 to 8, the positional relationship between the projected images of the light-receiving units 80, 81, 82, 83 in two pairs, in the focus detecting device of the present invention, onto the anticipated focal plane 16 and the focus frame provided in the view finder for indicating the focus detecting area.

Figure 5:
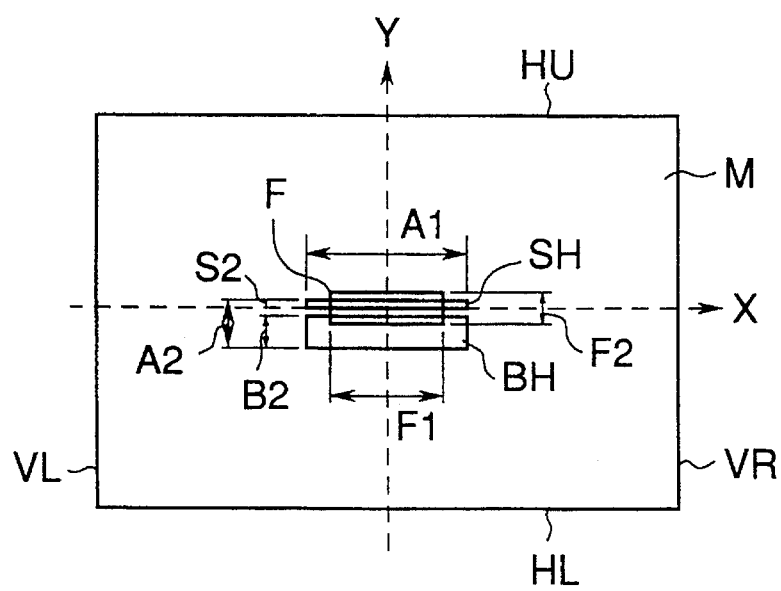
FIG. 5 is a view showing the phototaking frame of the first embodiment of the present invention.

FIG. 5 shows, on the phototaking image frame M in the view finder in the ordinary phototaking operation in the horizontal position, the relationship among the focus frame F, a projected image SH of the light-receiving units 80, 81 and a projected image SH of the light-receiving units 82, 83, wherein X-axis is a horizontal axis passing the center of the phototaking image frame, while Y-axis is a vertical axis passing the center of the phototaking image frame, said Y-axis being directed toward the upper side of the phototaking image frame. HU and HL indicate the longer sides of the phototaking image frame while VR and VL indicate the shorter sides thereof.

The projected image SH, obtained by inverse projection of the light-receiving units 80, 81 by said re-imaging means onto the anticipated focal plane, and the projected image BH, obtained by inverse projection of the light-receiving units 82, 83 by said re-imaging means onto the anticipated focal plane, are mutually parallel in the direction of arrangement of the pixels (direction of X-axis) and are also parallel to the longer sides HU, HL of the phototaking image frame. In the vertical direction of the phototaking image frame, the projected image SH is positioned higher than the projected image BH.

The projected images SH, BH have a length A1 (dimension in the direction of pixel array), and have respective width (dimension in a direction perpendicular to the direction of pixel array) S2, B2 wherein B2>S2. The projected images SH, BH have a total width A2 including the gap therebetween, and the Y-axis passes the central point of the length A1.

Figure 6:
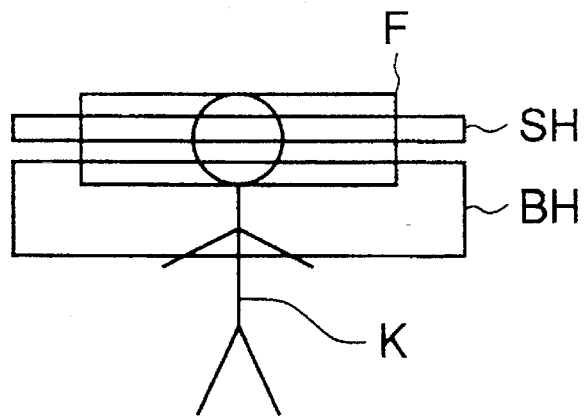
FIGS. 6, 7 and 8 are views showing the effect of the first embodiment of the present invention.

The focus frame F has a length F1, along the X-axis, selected smaller than A1, because the focusing operation to a small object may not be conducted successfully if the entire length of the projected images SH, BH designed relatively long for detecting the aberration in two images, is indicated as the focus frame. Also the dimension F2 of the focus frame F along the Y-axis is so selected as to satisfy a relation A2>F2>S2, because the actual width of the projected image SH is too small to be indicated as an easily visible focus frame and also because the focusing operation to a small object may not be conducted successfully if the focus frame is indicated wider than the total width A2 of the projected images SH and BH including the gap therebetween. The Y-axis passes through the center of the dimension F1 while the X-axis passes through the center of the dimension F2, and the projected image SH is included within the dimension F2. Thus the focus frame F is positioned symmetrically with respect to the X-axis, and the shape of the focus frame is matched with the projected image SH of the first light-receiving unit which is used more frequently and is capable of highly precise focus detection, so that the object is always captured by the first light-receiving unit whenever the focus frame is placed on the object. FIG. 6 shows a situation, in the above-explained configuration, where the head of an object person K is placed at the center of the focus frame F. The head is captured on the narrower projected image SH, while a part of the head and the body of said object person K at the substantially same distance are captured on the wider projected image BH. Thus a same result of focus detection can be obtained either by the first light-receiving unit or by the second unit.

Since the focus frame F is mostly occupied by the narrower projected image SH, the first light-receiving unit corresponding to said projected image SH can generally capture the object aimed at by the photographer but the second light-receiving unit corresponding to the wider projected image BH can only partly capture the object desired by the photographer. However the objects in the natural world, such as buildings, plants and human beings, have a high probability of being extended along the direction of gravity, so that, by positioning the wider projected image BH under the narrower projected image SH on the phototaking image frame in the ordinary phototaking state (in this case in the horizontal position), it is made possible to capture another part of the object, at a distance substantially same as that of the desired object.

Figure 7:
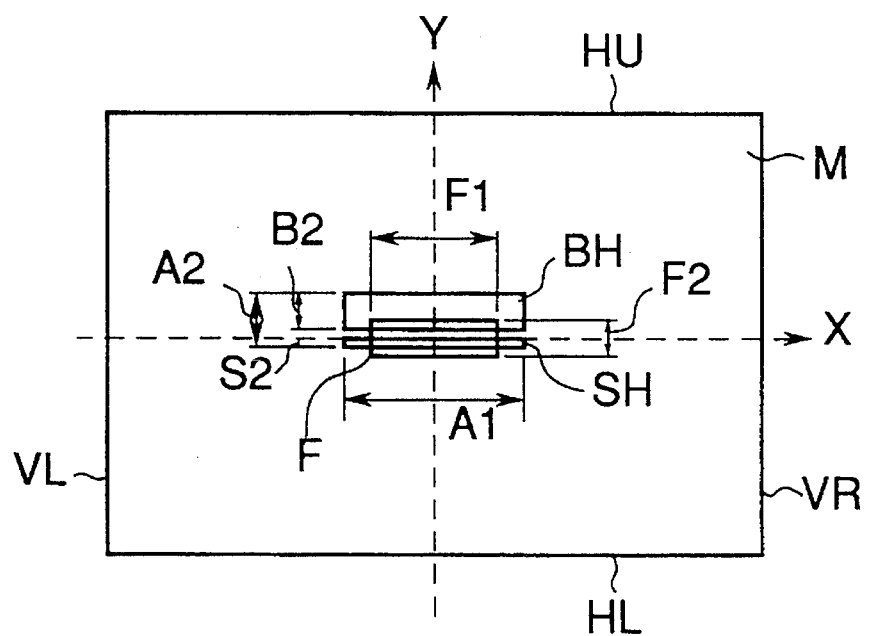

FIG. 7 shows a case in which the narrower projected image SH and the wider projected image BH are inverted on the phototaking image frame, in comparison with the case in FIG. 5, so that the projected image SH is positioned under the projected image BH in the vertical direction.

Figure 8:
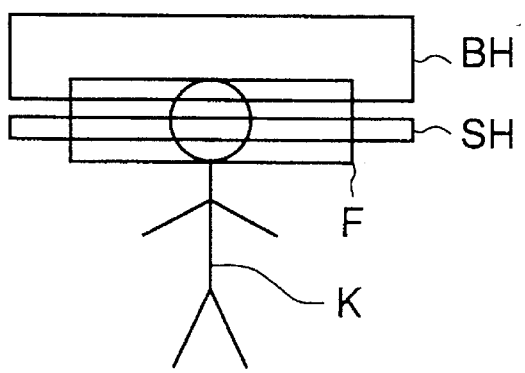

FIG. 8 shows a situation, in such configuration, where the head of an object person K is placed at the center of the focus frame F, whereby the narrower projected image SH captures the head while the wider projected image BH only captures the background behind said head. Consequently the first light-receiving unit can effect focus detection on the head of the object person, but the second light-receiving unit only effects focus detection on the background cannot, therefore, provide the same result of focus detection as that of the first light-receiving unit.

Figure 9:
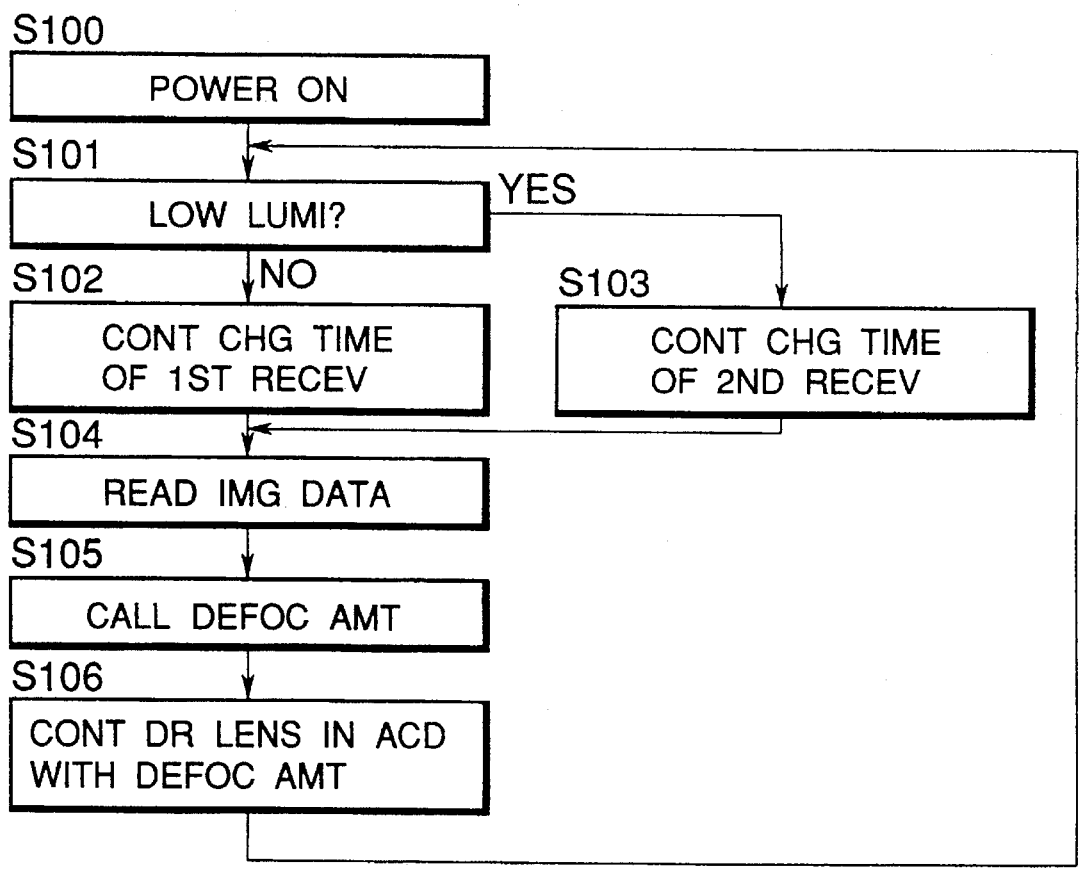
FIG. 9 is a flow chart showing the operation sequence of the first embodiment of the present invention.

FIG. 9 is a flow chart showing the control sequence of the microcomputer 14 constituting the control means 11, the focus detection calculating means 12 and the drive control means 13.

When the power supply is turned on in a step S100, the sequence starts to proceeds to a step S101.

The step S101 discriminates whether the object is of a low luminance by the output of an unrepresented photosensor, and, if the object is of a low luminance, the second light-receiving unit of a higher sensitivity is selected for reducing the charge accumulating time of the photosensor and the sequence proceeds to a step S103, but, in the ordinary case in which the object is not of a low luminance, there is selected the first light-receiving unit of a relatively low sensitivity, capable of precise focus detection, and the sequence proceeds to a step S102.

The step S102 causes the first light-receiving unit to effect the charge accumulating operation, and the sequence then proceeds to a step S104.

The step S103 causes the second light-receiving unit to affect the charge accumulating operation, and the sequence then proceeds to the step S104.

The image sensor is controlled by calculating the charge accumulating time in advance so as to obtain a predetermined output level from the first or second light-receiving unit, based on the output level and the accumulating time of said unit in the previous operation, and effecting the charge accumulating operation of the first or second light-receiving unit with such charge accumulating time.

A next step S104 read the object image data from the first or second light-receiving unit.

A step S105 calculates the defocus amount by processing the object image data.

A step S106 activates the motor 15 by an amount corresponding to said defocus amount, thereby bringing the phototaking optical system 3 to the in-focus state, and the sequence returns to the step S101 to repeat the above-explained sequence.

In the foregoing explanation of the first embodiment, either of the first and second light-receiving units having the wider projected image when inversely projected on the anticipated focal plane is employed for the focus detection in the low luminance state, but the first and second light-receiving units may also be selected in a different method. For example the second unit may be selected in case a lower precision of focus detection is permissible and the first unit may be selected in case a higher precision is required.

Also in FIG. 5, the narrower projected image SH and the wider projected image BH are assumed to be parallel to the longer sides HU, HL of the phototaking image frame, namely horizontal in the phototaking state in the horizontal position, but the effects of the present invention can be attained if said projected images are substantially horizontal.

Also in the first embodiment the narrower projected image SH and the wider projected image BH are positioned parallel to the longer sides HU, HL of the phototaking image frame, but they may also be positioned parallel to the shorter sides VR, VL of said phototaking image frame, with the narrower projected image SH closer to the shorter side VR than the wider projected image BH, whereby the advantages of the foregoing first embodiment can be attained in the phototaking operation in the vertical position (in which the vertical position release button 18 shown in FIG. 2 is positioned on the body 1).

In the following there will be explained a second embodiment of the present invention.

The second embodiment is different from the first one only in the focus detecting optical system and in the image sensor, so that the parts common to both embodiments will not be explained further.

Figure 10:
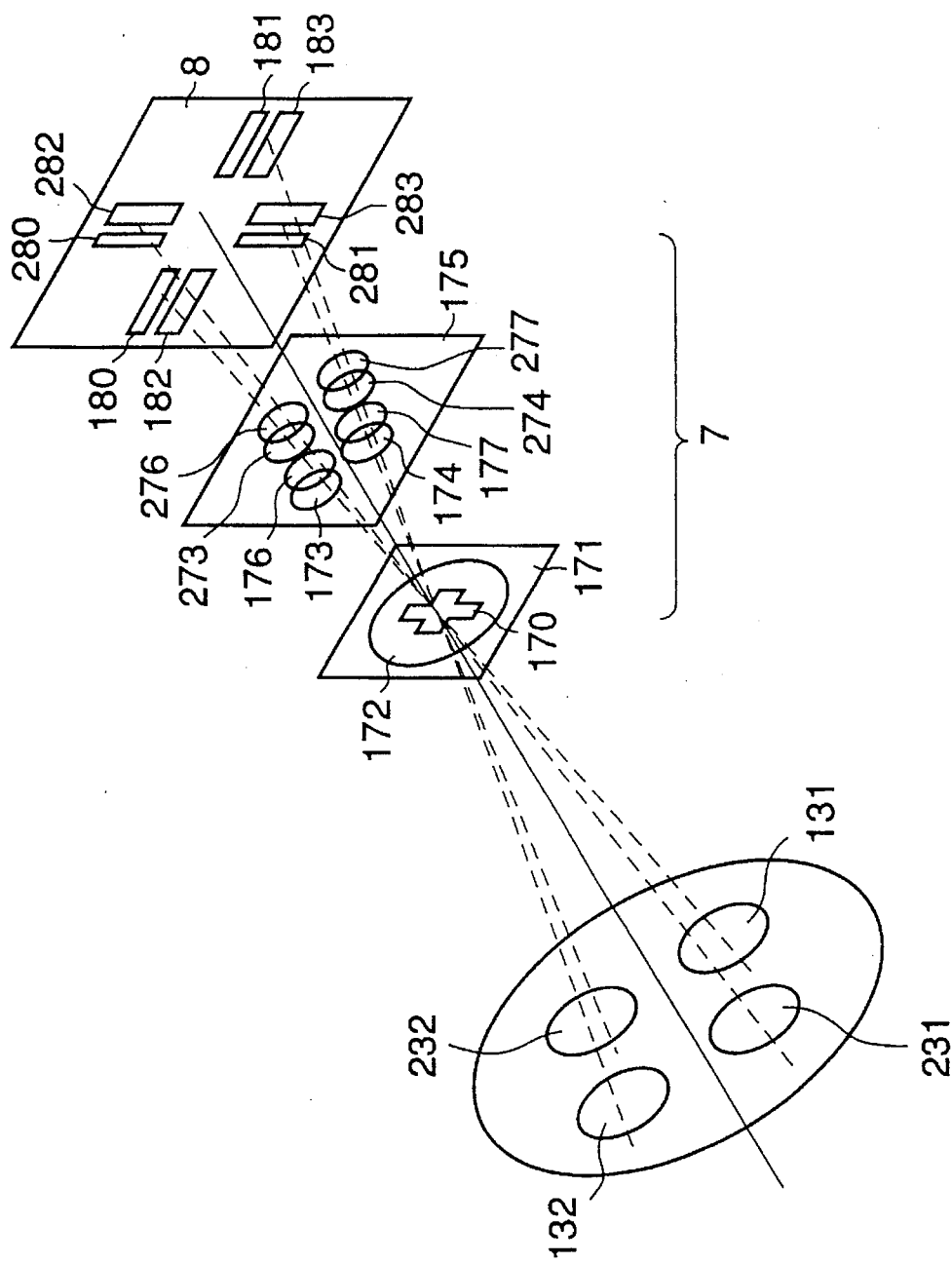
FIG. 10 is a perspective view of a focus detecting optical system of a second embodiment of the present invention.

FIG. 10 shows the configuration of the focus detecting optical system of the second embodiment of the present invention, wherein the focus detecting optical system 7 and the charge-accumulating image sensor 8 are designed for focus detection with a cross-shaped focus detecting area.

The focus detecting optical system 7 is composed of a field mask 171 having a cross-shaped aperture 170, a condenser lens 172, a diaphragm mask 175 having two pairs of diaphragm apertures 173, 174, 273, 274, and two pairs of re-imaging lenses 176, 177, 276, 277, and the charge-accumulating image sensor 8 is provided with four pairs of light-receiving units 180, 181; 182, 183; 280, 281; 282, 283.

The light-receiving units 180, 181 have a width, in a direction perpendicular to the direction of pixel array, smaller than that of the light-receiving units 182, 183 in a direction perpendicular to the direction of pixel array thereof. Also the light-receiving units 280, 281 have a width, in a direction perpendicular to the direction of pixel array, smaller than that of the light-receiving units 282, 283 in a direction perpendicular to the direction of pixel array thereof.

In the above-explained configuration, the paired diaphragm apertures 173, 174 are projected, by the condenser lens 172 as shown in FIG. 10, on a pair of areas 131, 132 symmetrical with respect to the optical axis on a plane 30 in the vicinity of the exit pupil 30 of the phototaking optical system 3, and the other pair of the diaphragm apertures 273, 274 are projected by the condenser lens 172 on a pair of areas 231, 232 symmetrical with respect to the optical axis on said plane 30 in the vicinity of the exit pupil of the phototaking optical system 3. The light beams passing said areas form a primary image in the vicinity of the field mask 171, and said primary image, formed in the aperture 170 of the field mask 171 is transmitted by the condenser lens 172 and the diaphragm apertures 173, 174, 273, 274 in two pairs, and is re-imaged by the two pairs of re-imaging lenses 176, 177, 276, 277 as two pairs of secondary images respectively on the light-receiving units 180, 182; 181, 183; 280, 282; 281, 283 of the charge-accumulating image sensor 8.

The intensity distributions of said secondary images in two pairs are converted by the light-receiving units 180, 182; 181, 183; 280, 282; 281, 283 into four pairs of electrical object image signals.

Said four pairs of electrical object image signals are fetched in the microcomputer 14 shown in FIG. 1, and the focus detection calculation means 12 determines the relative positional relationship of said object image signals by calculation, thereby detecting the defocus amount d between the image plane of the phototaking optical system 3 and the anticipated focal plane 16.

[Positional relationship between four light-receiving units and focus frame]

In the following there will be explained, with reference to FIG. 11, the positional relationship between the projected images of the four pairs of light-receiving units 180, 181, 182, 183; 280, 281, 282, 283 onto the anticipated focal plane 16 and the focus frame indicating the focus detecting area.

Figure 11:
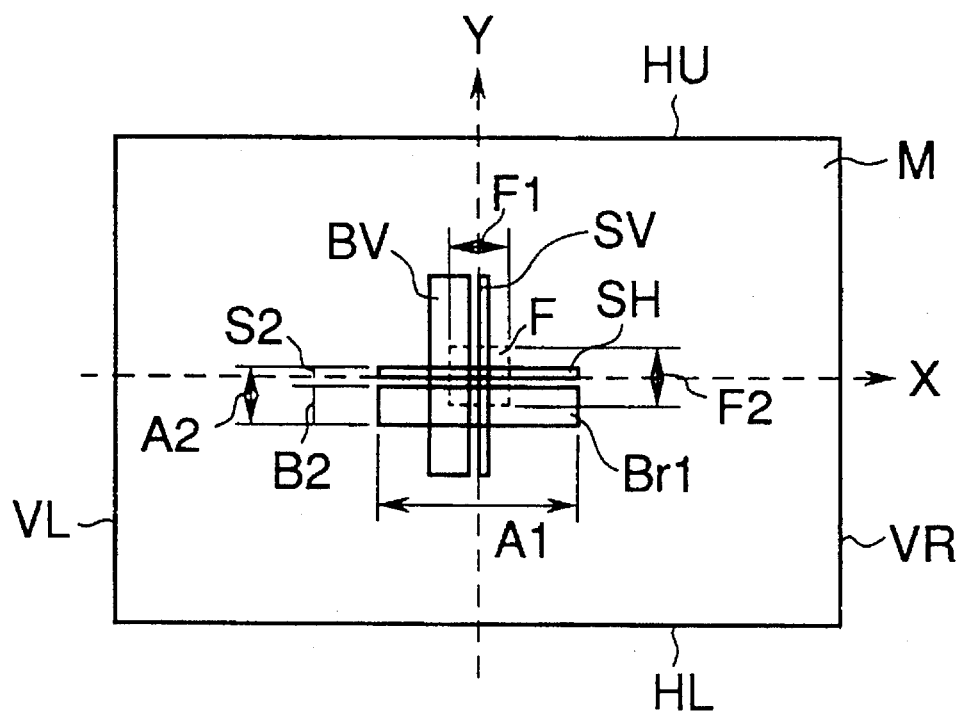
FIG. 11 is a view showing the phototaking frame of the second embodiment of the present invention.

FIG. 11 shows the positional relationship, on the phototaking image frame M in the view finder in the ordinary phototaking operation in the horizontal position, of the focus frame F, projected image SH of the light-receiving units 280, 281, projected image BH of the light-receiving units 182, 183, projected image SV of the light-receiving units 280, 281 and projected image BV of the light-receiving units 282, 283. The projected image SH obtained by inverse projection of the light-receiving units 180, 181 by the aforementioned re-imaging lenses 176, 177 onto the anticipated focal plane and the projected image BH obtained by inverse projection of the light-receiving units 182, 183 by the re-imaging lenses 176, 177 onto said anticipated focal plane are mutually parallel, in the direction of the pixel array (X-axis direction) and are parallel also to the longer sides HU, HL of said phototaking image frame, and said projected image SH is positioned above said projected image BH in the vertical direction of the phototaking image frame.

The projected images SH, BH have a lens (dimension in the direction of pixel array) A1 and have widths (dimensions in a direction perpendicular to the direction of pixel array) H2 and B2, wherein B2>H2. Also the projected images SH and BH have a total width A2, including the gap therebetween. The Y-axis passes the center of the length A1.

On the other hand, the projected image SV obtained by inverse projection of the light-receiving units 280, 281 by said re-imaging lenses 276, 277 onto the anticipated focal plane and the projected image BV obtained by inverse projection of the light-receiving units 282, 283 by said re-imaging lenses 276, 277 onto said anticipated focal plane are mutually parallel, in the direction of pixel array (Y-axis direction) and are parallel also to the shorter sides VR, VL of the phototaking image frame, and the projected image SV is positioned closer than the projected image BV to the shorter side VR.

The projected images SV, BV, being same in dimensions as the projected images SH, BH, have a length (dimension in the direction of pixel array) A1 and have respective widths (dimensions in a direction perpendicular to the direction of pixel array) S2 and B2, wherein B2>S2. The projected images SV and BV have a total width A2, including the gap therebetween. The X-axis passes the center of the length A1.

The focus frame F has dimensions F1 along the X-axis and F2 (=F1) along the Y-axis, which are so selected as to satisfy conditions S2<F1 and F2<A1 because the focusing operation to a small object may not be conducted successfully if the entire length of the projected images SH, BH, SV, BV, designed relatively long for detecting the aberration between the images, is indicated as the focus frame.

The Y-axis passes the central point of the length F1 while the X-axis passes the central point of the length F2. Thus the focus frame F is positioned symmetrically, with respect to the X- and Y-axis.

Also the center of the focus frame F is so positioned as to substantially coincide with the crossing point of the projected images SH, SV. Also a side of the focus frame F closer to the shorter side VL is positioned closer to the shorter side VR than a side of the projected image BV closer to the shorter side VL, so that the width of the projected image BV overflows the focus frame F. Also a side of the focus frame F closer to the longer side HL is positioned closer to the shorter side HU than a side of the projected image BH closer to the shorter side HL, so that the width of the projected image BH overflows the focus frame F. Such arrangement is because the focusing operation to a small object may not be conducted successfully if the focus frame F is so enlarged as to include the projected images BH, BV. In this manner the shape of the focus frame is matched with the projected images SH, SV of the light-receiving units which are used frequently in the ordinary cases and are capable of precise focus detection, so that the object is always captured by the light-receiving units corresponding to the narrower projected images SH, SV whenever the focus frame is placed on the object.

Such configuration provides the advantages of the first embodiment, both in the horizontal and vertical positions. More specifically stable focus detection is rendered possible, without erroneous focus detection on the background, by either of the light-receiving units 180, 181 or 182, 183 in the phototaking operation in the horizontal position, or by either of the light-receiving units 280, 281 or 282, 283 in the phototaking operation in the vertical position.

Also the narrower projected image is always positioned above on the image frame, both in the horizontal and vertical positions, the photographer can easily adjust the position of the object with respect to the focus frame, in consideration of such arrangement.

In the following there will be explained a third embodiment of the present invention.

As said third embodiment is different from the first and second embodiments only in the configuration of the focus detecting optical system and the image sensor, the parts common to these embodiments will not be explained further.

Figures 12A, 12B:
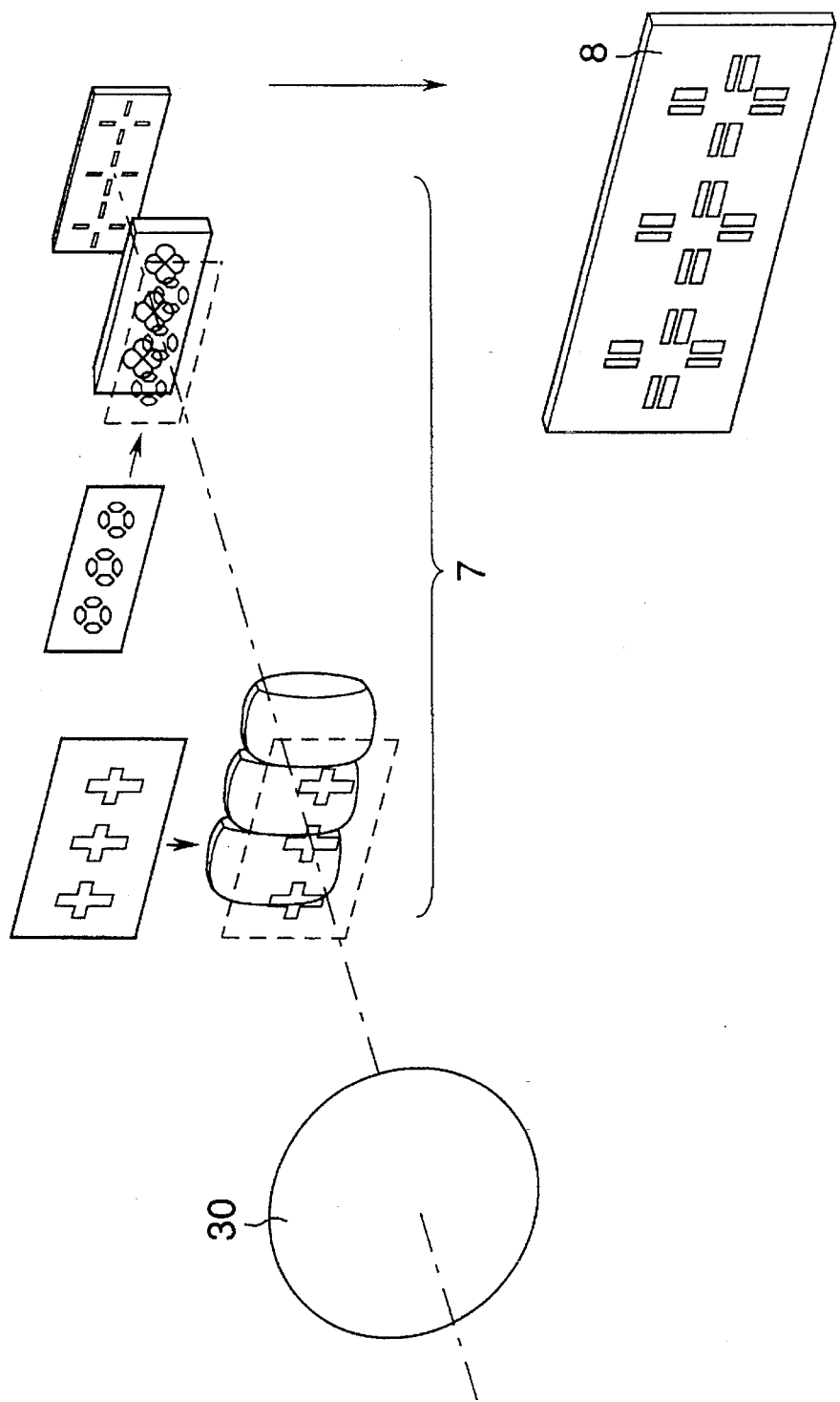
FIG. 12A is a perspective view of a focus detecting optical system of a third embodiment of the present invention.
FIG. 12B is a partial magnified view thereof.

FIGS. 12A and 12B illustrate the focus detecting optical system of the third embodiment, in which three sets of the focus detecting optical system 7 and the charge accumulating image sensor 8 shown in FIG. 10 are provided in parallel manner for effecting the focus detection, with the cross-shaped focus detecting area, at the center, and a right-hand position and a left-hand position in the phototaking image frame. The components of the focus detecting optical system will not be explained as they are same as those shown in FIG. 10.

The charge accumulating image sensor 8 is composed of 12 pairs of light-receiving units, wherein light-receiving units of a smaller width, in a direction perpendicular to the direction of pixel array, are paired with light-receiving units of a larger width, respectively in the cross-shaped focus detecting areas at the center, at the right and at the left.

Figure 13:
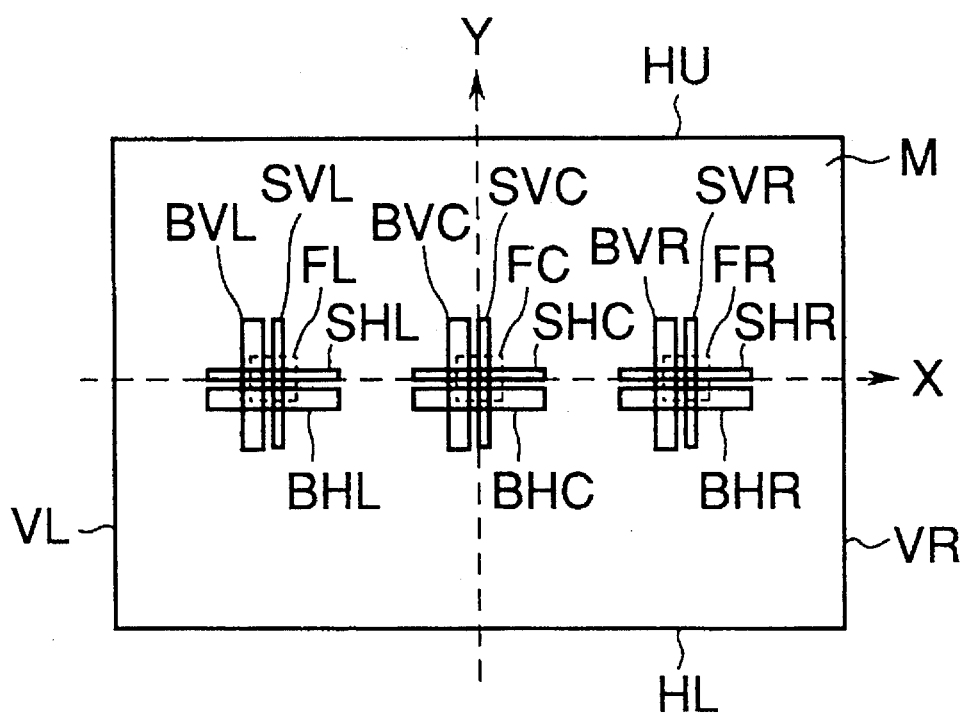
FIG. 13 is a view showing the phototaking frame of the third embodiment of the present invention.
Figure 14:
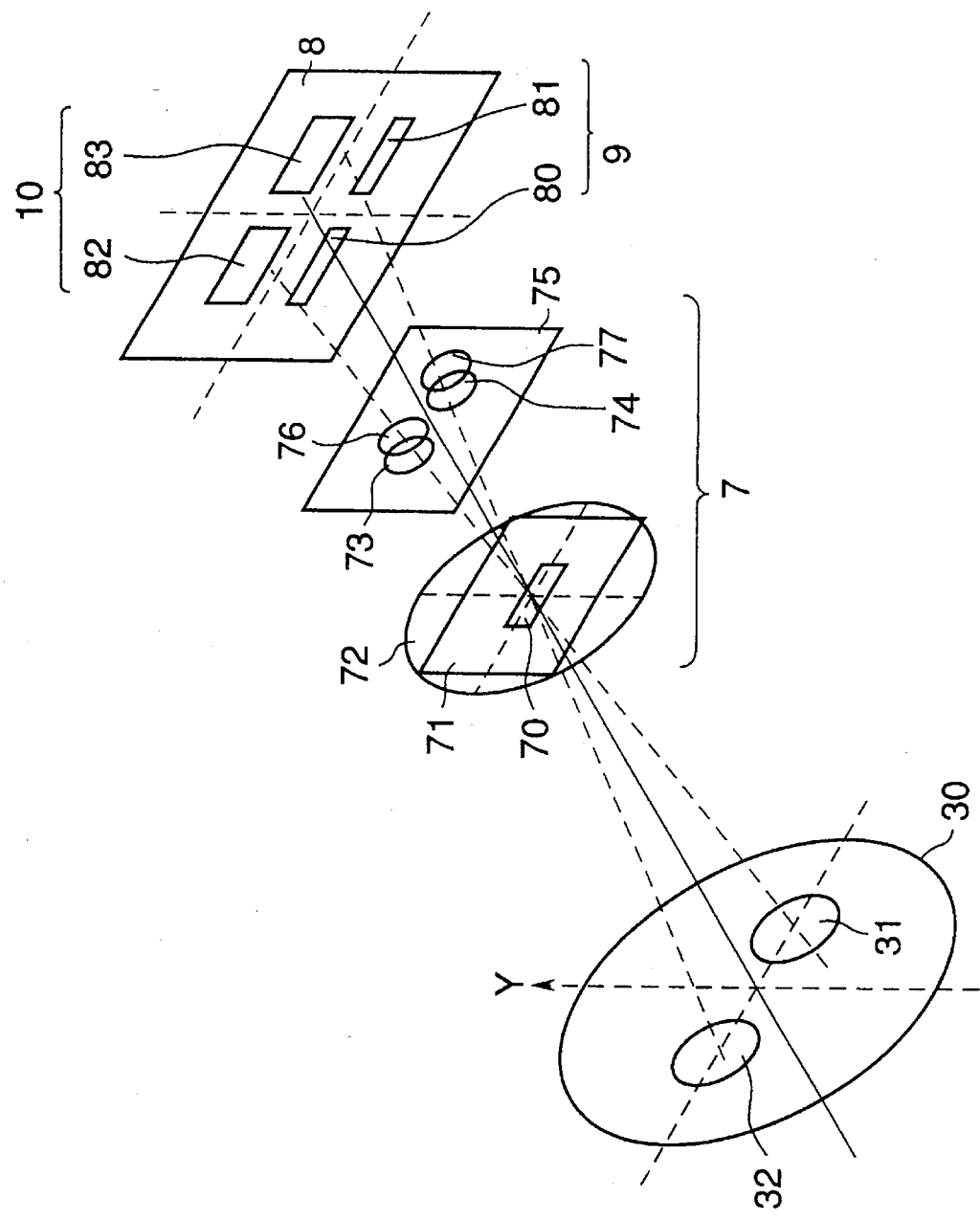
FIG. 14 is a perspective view of a focus detecting optical system of a fourth embodiment of the present invention.

Now reference is made to FIG. 13, for explaining the positional relationship between the projected images of the 12 pairs of the light-receiving units onto the anticipated focal plane 16 and the focus frame indicating the focus detecting area.

FIG. 13 shows, on the phototaking image frame M in the view finder in the ordinary phototaking operation in the horizontal position, the relationship among a central focus frame FC; a right focus frame FR; a left focus frame FL; a projected image SHC corresponding to a narrower horizontal light-receiving unit at the center; a projected image BHC corresponding to a wider horizontal light-receiving unit at the center; a projected image SVC corresponding to a narrower vertical light-receiving unit at the center; a projected image BVC corresponding to a wider vertical light-receiving unit at the center; a projected image SHR corresponding to a narrower horizontal light-receiving unit at the right; a projected image BHR corresponding to a wider horizontal light-receiving unit at the right; a projected image SVR corresponding to a narrower vertical light-receiving unit at the right; a projected image BVR corresponding to a wider vertical light-receiving unit at the right; a projected image SHL corresponding to a narrower horizontal light-receiving unit at the left; a projected image BHL corresponding to a wider horizontal light-receiving unit at the left; a projected image SVL corresponding to a narrower vertical light-receiving unit at the left; and a projected image BVL corresponding to a wider vertical light-receiving unit at the left.

The projected images SHC and BHC are mutually parallel in the direction of pixel array (X-axis direction) and are parallel also the longer sides HU, HL of the phototaking image frame, and the projected image SH is positioned above BH in the vertical direction of the phototaking image frame.

The projected images SVC and BVC are mutually parallel in the direction of pixel array (Y-axis direction) and are parallel also to the shorter sides VR, VL of said phototaking image frame, and the projected image SVC is positioned closer, than the projected image BVC, to the shorter side VR.

The projected images SHC, BHC, SVC and BVC have dimensions same as those shown in FIG. 11.

Also the dimensions of the focus frame FC are same as those shown in FIG. 11.

Also the projected images SHR, BHR, SVR, BVR and the focus frame FR at the right are basically same as those at the center in the dimensions and in the positional relationship, except for a shift to the right along the X-axis.

In the following there will be explained fourth, fifth and sixth embodiments of the present invention, with reference respectively to FIGS. 14 to 19, FIGS. 20 and 21, and FIGS. 22A to 23. Since said fourth, fifth and sixth embodiments are basically same respectively as the foregoing first, second and third embodiment, the following description will be concentrated on the different points.

Figure 15:
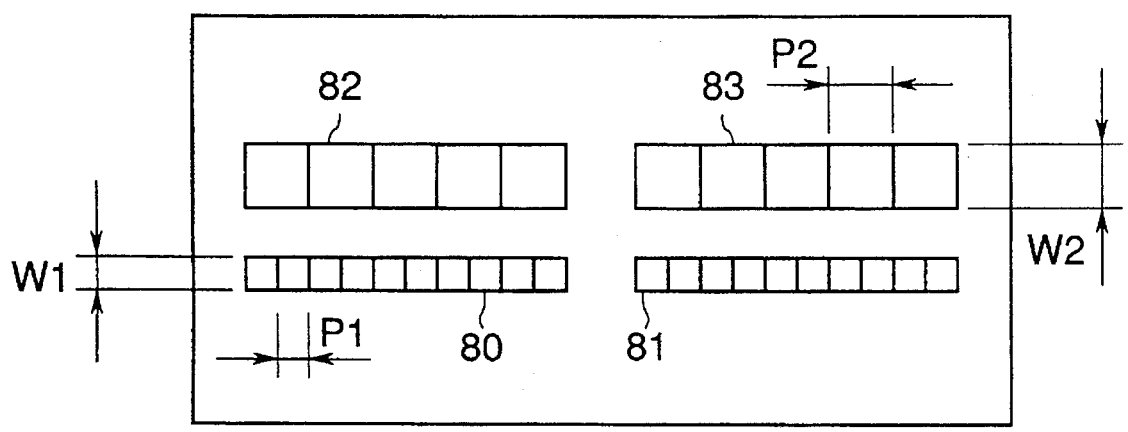
FIG. 15 is a view of an image sensor of the fourth embodiment of the present invention.
Figure 16:
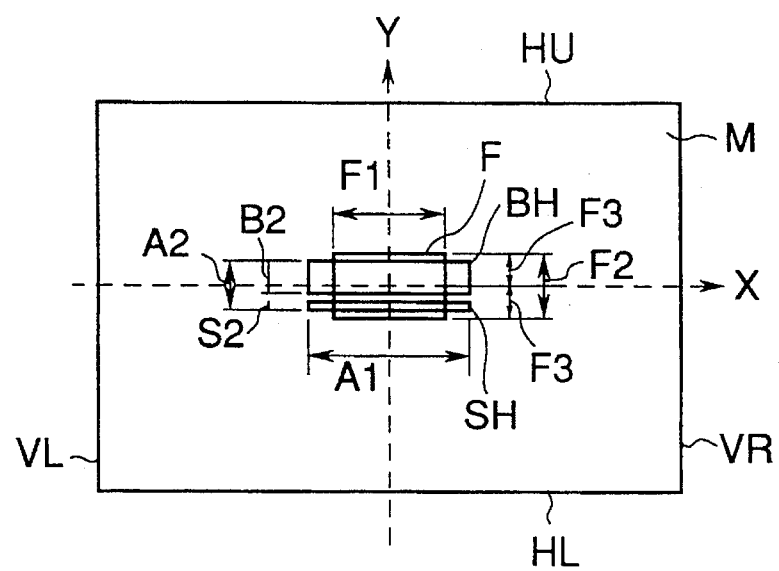
FIG. 16 is a view showing the phototaking frame of the fourth embodiment of the present invention.

In the fourth embodiment, the positional relationship between the light-receiving units 80, 81 and those 82, 83 is inverted, as shown in FIG. 15, in comparison with the first embodiment, so that the projected image SH is positioned below the projected image BH in the vertical direction of the phototaking image frame as shown in FIG. 16.

Also the projected images SH and BH have a total width A2, including the gap therebetween, as in the first embodiment, but the Y-axis passes the center of the length A1 and the X-axis passes the center of the width A2.

The focus frame F has a dimension F2 along the Y-axis, selected larger than A2, because of the entire width of the projected images SH, BH is too small, to be indicated as the focus frame, for easy observation at the focusing operation. The Y-axis passes the central point of F1, and the X-axis passes the central point of F2 (in FIG. 16, the length F3 from the X-axis to the end of the focus F is equal to a half of F2). Thus the focus frame F is positioned symmetrically with respect to the X-axis.

Figure 17:
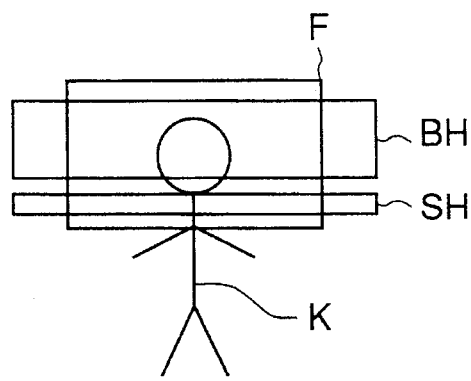
FIGS. 17, 18 and 19 are views showing the effect of the fourth embodiment of the present invention.

FIG. 17, similar to FIG. 6, shows a situation where the head is substantially captured by the wider projected image BH while the body of the object person K, of a substantially same distance as that of the head, is captured by the narrower projected image SH. Thus a same result of focus detection can be obtained by the light-receiving units 80, 81 or by the units 82, 83.

Therefore, in the fourth embodiment, as in the first embodiment, another part of the object, positioned at a substantially same distance as that of the desired object, can be captured by positioning the narrower projected image SH below the wider projected image BH, on the phototaking image frame in the ordinary phototaking state (in the horizontal position in this case).

Figure 18:
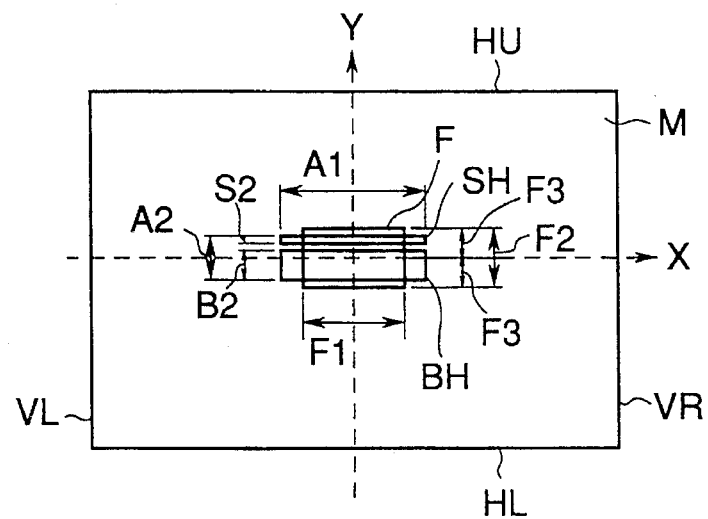

FIG. 18 shows the positional relationship of the narrower projected image SH and the wider projected image BH on the phototaking image frame, wherein the former is positioned above, contrary to the position shown in FIG. 5.

Figure 19:
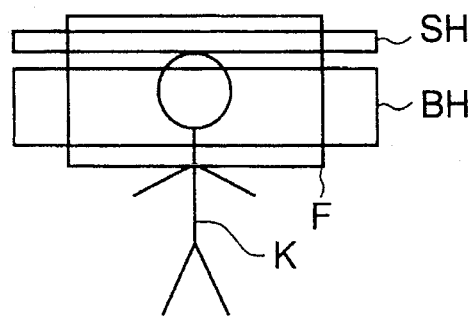
Figure 20:
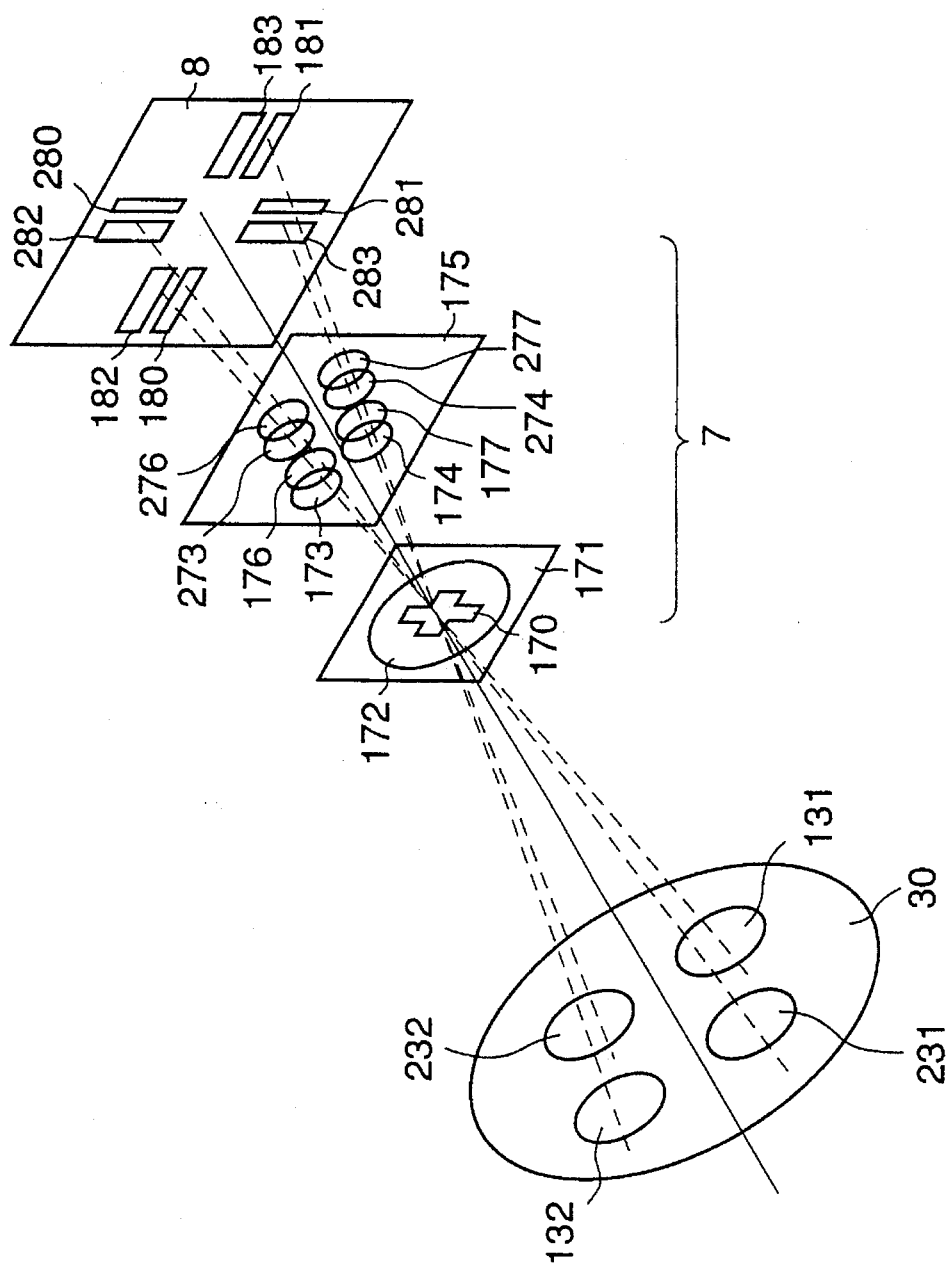
FIG. 20 is a perspective view of a focus detecting optical system of a fifth embodiment of the present invention.

FIG. 19 shows a situation where, in such configuration, the head of an object person K is placed at the center of the focus frame F. The wider projected image BH substantially captures the head but the narrower projected image SH captures the background behind said head. Consequently the light-receiving units 82, 83 can effect focus detection to the head of the object person, but the light-receiving units 80, 81 can only effect focus detection on the background and cannot, therefore, provide the same result of focus detection as in the light-receiving units 82, 83.

Figure 21:
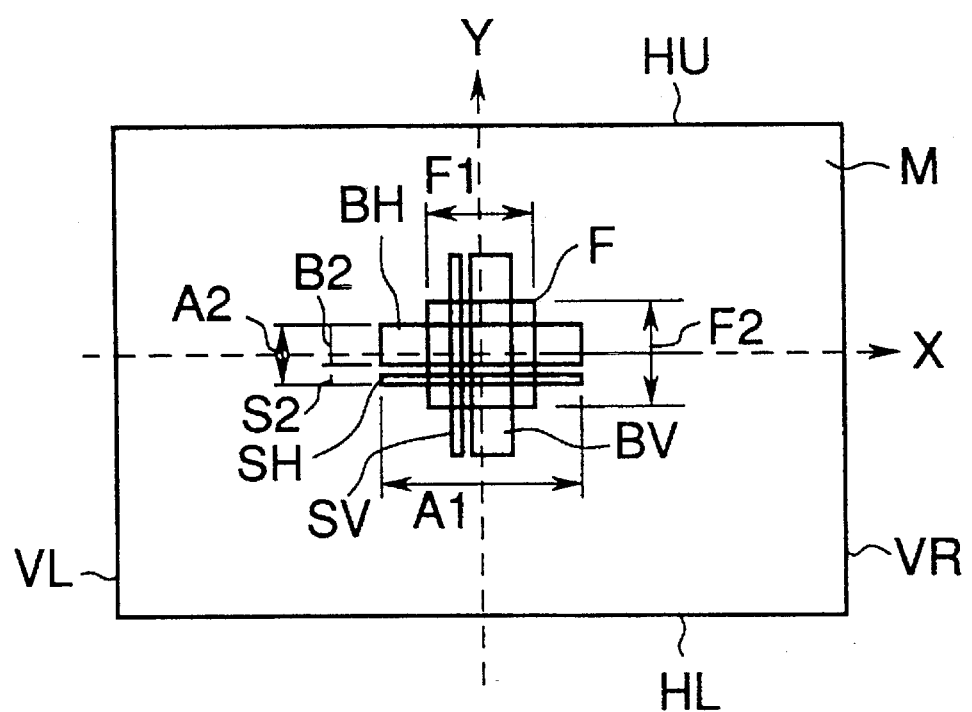
FIG. 21 is a view showing the phototaking frame of the fifth embodiment of the present invention.

In the fifth embodiment, as shown in FIG. 21, the projected image SH obtained by inverse projection of the light-receiving units 180, 181 by the re-imaging lenses 176, 177 onto the anticipated focal plane and the projected image BH obtained by inverse projection of the light-receiving units 182, 183 by said re-imaging lenses 176, 177 onto said anticipated focal plane are mutually parallel in the direction of pixel array (X-axis direction) and are parallel also to the longer sides HU, HL of the phototaking image frame, and the projected image SH is positioned below the image BH in the vertical direction of the phototaking image frame.

The projected images SH, BH have a length (dimension along the direction of pixel array). A1 and have respective widths (dimensions in a direction perpendicular to the direction of pixel array) S2 and B2, wherein B2>S2. The projected images SH and BH have a total width A2 including the gap therebetween. Y-axis passes the central point of the length A1, and the X-axis passes the central point of the total width A2.

On the other hand, the projected image SV obtained by inverse projection of the light-receiving units 280, 281 by the re-imaging lenses 276, 277 onto the anticipated focal plane and the projected image BV obtained by inverse projection of the light-receiving units 282, 283 by said re-imaging lenses 276, 277 onto said anticipated focal plane are mutually parallel along the direction of pixel array (Y-axis direction) and are parallel also to the shorter sides VR, VL of the phototaking image frame, and the projected images SV is positioned closer than the projected image BV to the shorter side VL.

The projected images SV and BV have a total width A2, including the gap therebetween. The X-axis passes the central point of the length A1, and the Y-axis passes the central point of the width A2.

The focus frame F has dimensions F1 along the X-axis and F2 (=F1) along the Y-axis, which are so selected as to satisfy conditions S2<F1 and F2<A1, because the focusing operation to a small object may not be conducted successfully if the entire lengths of the projected images SH, BH, SV, BV, selected relatively long for detecting the aberration in the images; are indicated as the focus frame.

Figure 22:
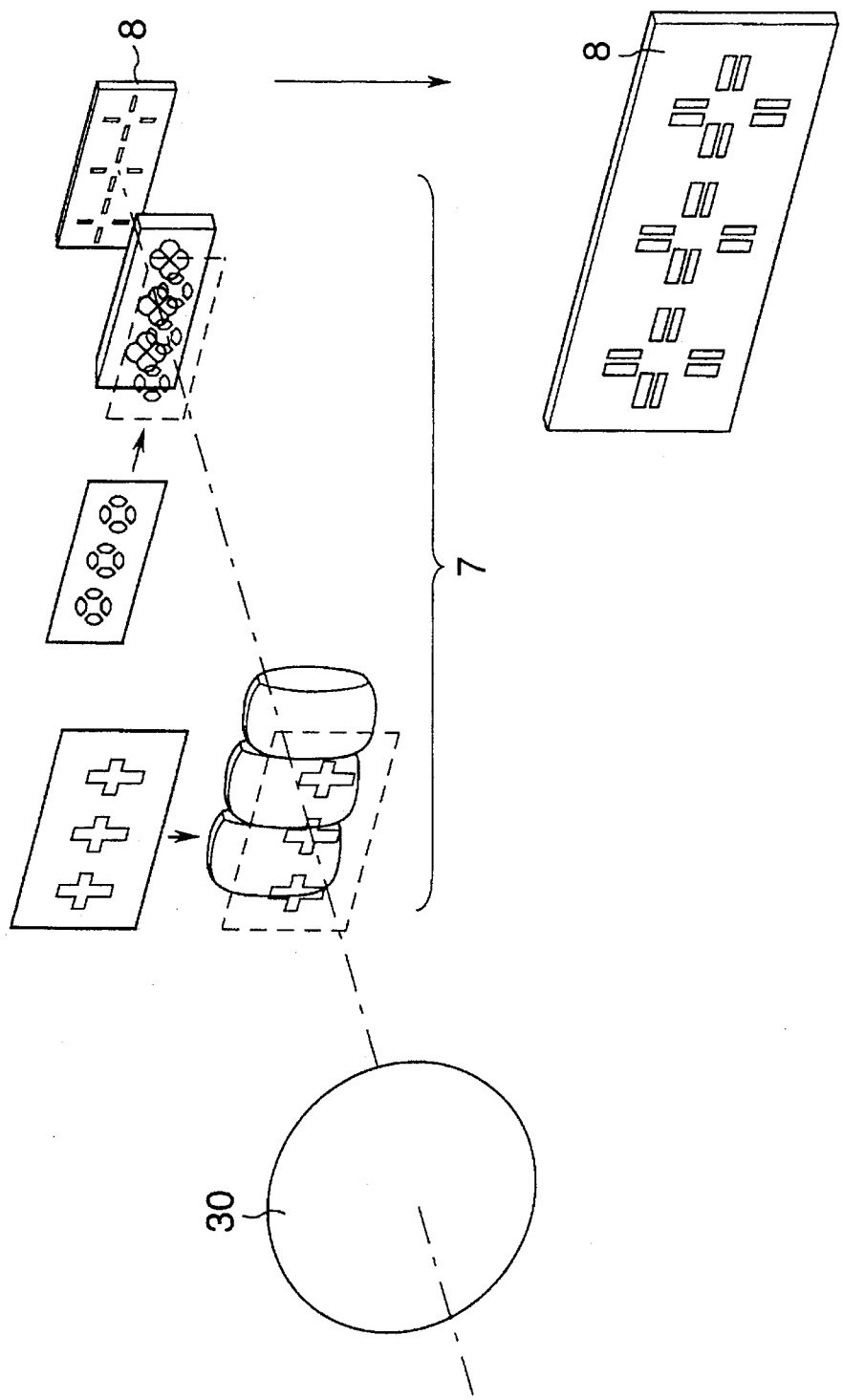
FIG. 22A is a perspective view of a focus detecting optical system of a sixth embodiment of the present invention.
FIG. 22B is a partial magnified view thereof.
Figure 23:
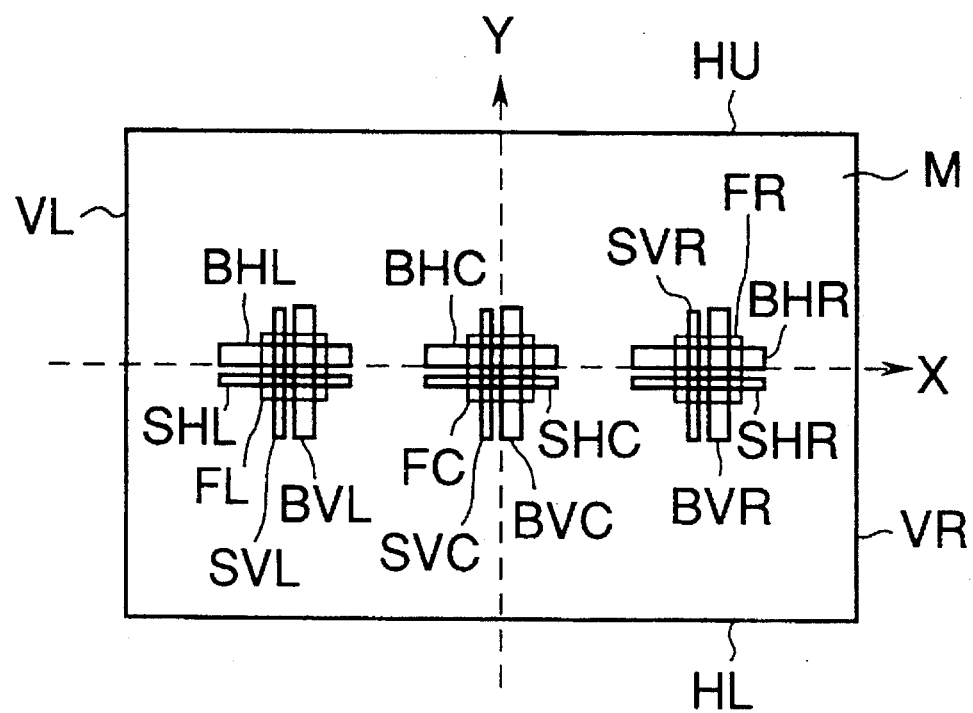
FIG. 23 is a view showing the phototaking frame of the sixth embodiment of the present invention.

The sixth embodiment shown in FIGS. 22A to 23 is different from the fourth and fifth embodiments only in the configuration of the focus detecting optical system and of the image sensor, so that the parts common to these embodiments will not be explained further.

The projected images SHC, BHC are mutually parallel along the direction of pixel array (X-axis direction) and are parallel also to the longer sides HU, HL of the phototaking image frame, and the projected image SH is positioned below BH in the vertical direction in the phototaking image frame.

Also the projected images SVC, BVC are mutually parallel along the direction of pixel array (Y-axis direction) and are parallel also to the shorter sides VR, VL of the phototaking image frame, and the projected image SVC is positioned closer than the image BVC to the shorter side VL.

As explained in the foregoing, in the present invention, the projected image of a light-receiving unit of a smaller width, on the anticipated focal plane, is positioned below the projected image of a light-receiving unit of a larger width on the phototaking image frame, so that the probability of capture of the desired object by the light-receiving unit with a smaller width in the projected image can be increased when the focus frame in the view finder is placed on the desired object.

What is claimed is:

1. A focus detecting camera, comprising:
   a phototaking optical system forming a primary image of
      an object on a rectangular phototaking image frame, said rectangular phototaking image frame defined on a predetermined focal plane of the focus detecting camera and having a horizontally extending first side and a vertically extending second side relative to an ordinary phototaking position of the focus detecting camera;

a focus detecting optical system provided with a pair of re-imaging optical elements for respectively re-imaging said primary image, in a focus detecting area defined in said rectangular phototaking image frame as a pair of secondary images;

an image sensor including a one-dimensional array of plural pixels respectively receiving said pair of secondary images, said image sensor also including a first and a second light-receiving unit; and a focus detecting calculation unit processing an output of said image sensor to detect a focus state of said phototaking optical system with respect to said predetermined focal plane;

wherein, in projected images obtained by inverse projection of said first and second light-receiving units by said pair of re-imaging optical elements onto the predetermined focal plane, a direction of a one-dimensional array of said projected images of the first and second light-receiving units is separate and substantially parallel to a first or a second side of said rectangular phototaking image, frame, and, in a direction perpendicular to said direction of said one-dimensional array, pixels of said second light-receiving unit have a width wider than that of pixels of said first light-receiving unit; and wherein, a first width including widths of the projected images of said first and second light-receiving units and a gap width formed between the projected images is larger than a second width of a focus frame provided for indicating a focus detecting area in a view finder of the focus detecting camera.

2. A focus detecting camera according to claim 1, wherein said horizontally extending first side is longer than said vertically extending second side.

3. A focus detecting camera according to claim 1, wherein the projected image of said first light-receiving unit is positioned laterally above the projected image of said second light-receiving unit in the phototaking image frame relative to a normal phototaking position.

4. A focus detecting camera according to claim 1, wherein the projected image of said first light-receiving unit is positioned laterally below the projected image of said second light-receiving unit in said phototaking image frame relative to a normal phototaking position.

5. A focus detecting camera according to claim 1, wherein a first width, including the projected images of said first and second light-receiving units and a gap formed between said projected images is smaller than a second width of a focus frame provided for indicating a focus detecting area in a view finder of the focus detecting camera.

6. A focus detecting camera according to claim 5, wherein said focus frame is centrally positioned in said view finder.

* * * * *